June 13, 1950 W. H. CHURCHILL 2,511,801
FASTENER CLIP
Filed June 14, 1944
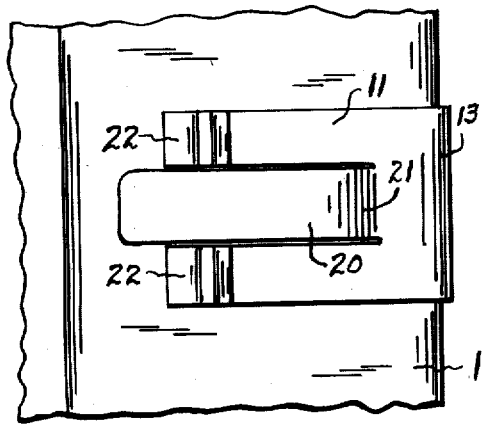
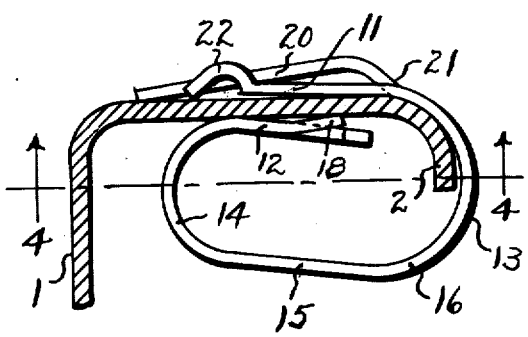
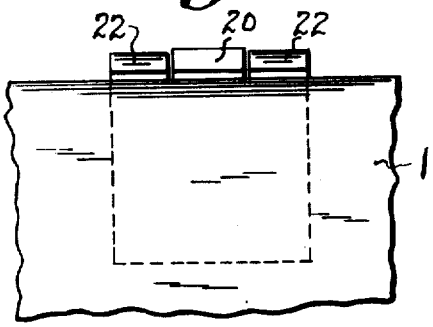
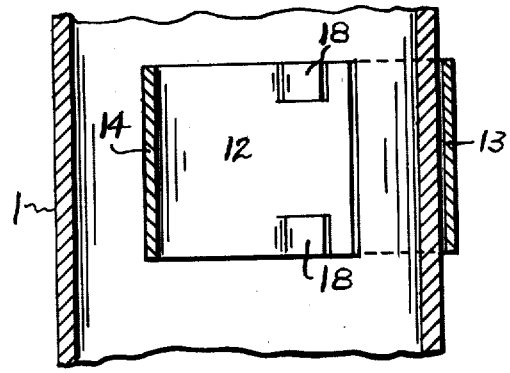
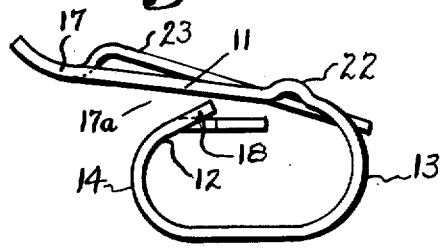
Inventor
Witmer H. Churchill.
By Walter S. Jones
Attorney Patented June 13, 1950

2,511,801

UNITED STATES PATENT OFFICE 2,511,801

FASTENER CLIP

Wilmer H. Churchill, Saugus, Mass., assignor to United-Carr Fastener Corporation, Cambridge, Mass., a corporation of Massachusetts Application June 14, 1944, Serial No. 540,304

1 Claim. (Cl. 24—81)

The present invention relates to fastener clips and more particularly to fastener clips designed to be slipped upon a support and grip the opposite faces thereof and provided with means to slidably receive and retain a part to be supported by the support.

More particularly the invention provides an improved and simplified fastener clip for removably attaching cable harness clamps to a structural member or support.

Other aims and advantages of the invention will be apparent from a consideration of the accompanying drawing and annexed specification illustrating and describing a preferred form of the invention.

In the drawing:

Fig. 1 is an enlarged top plan view of a portion of a support with one form of the improved clip applied thereto;

Fig. 2 is a side elevation of the clip shown in Fig. 1, the support being shown in section;

Fig. 3 is an edge elevation thereof;

Fig. 4 is a horizontal section thereof taken on the line 4—4 of Fig. 2 and looking in the direction of the arrow to illustrate the support-engaging portion for engaging and gripping the under surface of the support; and Fig. 5 is a side elevation of a slightly modified form of clip.

Referring further to the drawing, the improved fastener clip is advantageously formed of a single piece of resilient material, such as spring sheet metal, and comprises a substantially elongated loop-shaped member having overlapping portions or surfaces adapted to bear against and grip opposite faces of a support. Each of the support-engaging portions is connected at one of its ends with a curved bight portion forming opposite ends of the loop and these bight portions are in turn joined by a connecting surface. One of the support-engaging portions of the connecting portion is advantageously provided with article-supporting means and preferably this article-supporting means may take the form of a resilient tongue struck up from its surface so as to be engaged over the part or article to be supported against that surface.

In the illustrative embodiment of the invention shown in Figs. 1 to 4 of the drawings, the clip is formed to elongated loop form, as shown in Fig. 2, providing overlapping support-engaging portions 11—12, the portion 11 engaging the outer face of the support 1 and the portion 12 engaging the opposite or under face thereof. The support-engaging portion 11 has connected at one of its ends an arcuate flexible bight portion 13 forming one end of the loop and the portion 12 has connected at one of its ends a similar flexible arcuate bight portion 14 forming the opposite end of the loop. The loops are joined by a connecting portion 15 disposed in a plane spaced substantially from the planes of both support-engaging portions 11 and 12.

The above described construction is of particular advantage in the construction of fastener clips adapted to be applied to supports having a flange 2 along one edge thereof, such as structural angles, channels and Z-bar sections commonly used in aircraft construction, in that it provides a point of flexure at the junction 16 of the bight portion 13 and connecting portion 15 which operates either along or in cooperation with the flexible bight portion 14 to permit ready separation of the support-engaging surfaces 11—12 as the clip is forced over the support 1. The terminal end of the support-engaging portion may be flared outwardly as at 17 in the modified form of fastener illustrated in Fig. 5 so as to form with the adjacent surface of the bight 14 a flaring entering throat 17a for the support.

The terminal end of the underlying support-engaging portion 12 provides a means to prevent the ready removal of the clip from the support. Any force tending to push the clip off the support around the flange will cause the terminal end to push against the inner surface of the flange. In addition, the underlying support-engaging portion 12 is preferably provided with means to grip the surface of the support and prevent slipping of the clip on the support. Preferably these anti-slip means may comprise resilient teeth 18 cut from the body of the portion 12 and bent toward the opposed support-engaging portion 11 to provide resilient teeth capable of biting into the support.

The clip of the present invention provides article-engaging means on one of its flat surfaces and advantageously the article-supporting means is provided on the support-engaging portion 11. Preferably the article-supporting means comprises a tongue 20 cut from the metal of the portion 11 and joined thereto as at 21 adjacent the bight 13. The tongue is preferably displaced outwardly from the portion 11 to receive a part to be supported by the clip, such as a sheet metal part of a cable harness clamp which advantageously may be of the type shown in United States patent to Wilmer H. Churchill No. 2,237,326, of August 17, 1943. Portions of the portion 11 on opposite sides of the tongue 20 may be pressed outwardly in substantial V-formation to provide stops 22 to prevent movement of the part supported on the portion 11 and under the tongue.

A slightly modified form of the invention is shown in Fig. 5 wherein the tongue 23 is joined to the portion 11 adjacent the terminal end thereof and extends toward the bight.

The clip of the present invention is simple of construction and may be easily slipped upon supports of a variety of shapes due to the looped form of the clip. The provision of the gripping teeth 18 on one of the support-engaging portions holds the clip securely on the support.

Although I have illustrated and described one specific embodiment of the invention, I do not wish to be limited thereby because the scope of the invention is best defined by the following claim:

I claim:

A fastener clip for attachment to a support having a substantially flat portion and a flanged portion extending downwardly from the outer edge of and substantially normal to the flat portion, said clip being formed of a single piece of metal and comprising a pair of superposed substantially parallel support-engaging portions having opposed flat surfaces for engaging the opposite faces of the flat portion of a support, an enlarged loop portion connecting opposite ends of said support-engaging portions and including opposed resilient bight portions and a connecting portion, one of said bight portions being integrally connected to the end of one of said support-engaging portions and extending around the adjacent end of the other support-engaging portion and integrally joining said connecting portion, the other of said bight portions integrally joining said connecting portion and the opposite end of said other support-engaging portion, said other support-engaging portion extending from its point of connection with said other bight portion to the point of connection of said one bight portion with said one support-engaging portion and being substantially parallel to and coextensive with said connecting portion, said other support-engaging portion having support-gripping teeth struck up therefrom for engaging the support and having a free end portion extending outwardly in prolongation thereof to provide an edge for engaging a flange of a support, and said one support-engaging portion having an article-engaging and supporting means struck up therefrom and disposed on a face opposite said connecting portion.

WILMER H. CHURCHILL.

REFERENCES CITED

The following references are of record in the file of this patent:

UNITED STATES PATENTS

| Number | Name | Date |
| --- | --- | --- |
| 337,200 | Sargent | Mar. 2, 1886 |
| 539,127 | Gump | May 14, 1895 |
| 1,105,542 | Tobie | July 28, 1914 |
| 1,431,388 | Ferguson | Oct. 10, 1922 |
| 1,593,776 | Raymond | July 27, 1926 |
| 1,739,057 | Bock | Dec. 10, 1929 |
| 2,115,312 | Lombard | Apr. 26, 1938 |
| 2,127,234 | Reiter | Aug. 16, 1938 |
| 2,327,326 | Churchill | Aug. 17, 1943 |
| 2,329,894 | Hall | Sept. 21, 1943 |
| 2,329,974 | Bennett | Sept. 21, 1943 |
| 2,332,855 | Jones | Oct. 26, 1943 |
| 2,385,209 | Joyce | Sept. 18, 1945 |